(12) United States Patent
Connor

(10) Patent No.: US 6,735,662 B1
(45) Date of Patent: May 11, 2004

(54) METHOD AND APPARATUS FOR IMPROVING BUS EFFICIENCY GIVEN AN ARRAY OF FRAMES TO TRANSMIT

(75) Inventor: Patrick L. Connor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 462 days.

(21) Appl. No.: 09/663,952

(22) Filed: Sep. 19, 2000

(51) Int. Cl.[7] .................. G06F 13/36; G06F 13/14; G06F 13/28; G06F 15/16; H04J 3/24
(52) U.S. Cl. .................. 710/308; 710/305; 710/22; 710/30; 370/473; 709/236
(58) Field of Search .................. 370/473; 709/236, 709/237; 710/22–28, 30, 52, 305, 306, 308, 310

(56) References Cited

U.S. PATENT DOCUMENTS 6,101,397 A * 8/2000 Grob et al. .................. 455/557
6,161,160 A * 12/2000 Niu et al. .................. 710/310
6,212,203 B1 * 4/2001 Anderson et al. ........... 370/473
6,330,286 B1 * 12/2001 Lyons et al. ............ 375/240.28

OTHER PUBLICATIONS

Okajima, "Data communication method", Jun. 20, 1997, Derwent–Week 199735, Pub–No JP 09162948A.*

* cited by examiner

Primary Examiner—Gopal C. Ray
Assistant Examiner—Trisha Vu
(74) Attorney, Agent, or Firm—Blakely, Sokoloff, Taylor & Zafman LLP

(57) ABSTRACT

A single completion status write back is generated by a controller to inform a driver of completion of a transmission of all frames of an array of frames, as opposed to generating individual write backs for each frame. The driver identifies one of the frames that is reported with the completion status, and applies the completion status to that frame and to all frames of the array sent prior to that frame. Reducing the number of these overhead completion status write backs improves bus and data transfer efficiency.

16 Claims, 3 Drawing Sheets

METHOD AND APPARATUS FOR IMPROVING BUS EFFICIENCY GIVEN AN ARRAY OF FRAMES TO TRANSMIT

BACKGROUND OF THE INVENTION

1. Field of the Invention

The present invention relates generally to data transfers in systems, and in particular, relates to improving data transfer and bus efficiency by minimizing bus contention when a device reads data from memory.

2. Background Information

In computer systems, components are coupled to each other via one or more busses. A variety of components can be coupled to the bus, thereby providing intercommunication between all of the various components/devices. An example of a bus that is used for data transfer with a processor or for data transfer between a memory and another device is the peripheral component interconnect (PCI) bus.

In order to relieve a processor of the burden of controlling the movement of blocks of data inside of a computer, direct memory access (DMA) transfers are commonly used. With DMA transfers, data can be transferred from one memory location to another memory location, or from a memory location to an input/output (I/O) device (and vice versa), without having to go through the processor. Additional bus efficiency is achieved by allowing some of the devices connected to the PCI bus to be DMA masters.

When transferring data using DMA methods, scatter gather descriptors are often used. High performance I/O controllers, such as gigabit Ethernet media access control (MAC) network controllers, are typically scatter gather descriptor-based bus-mastering devices that allow a computer to communicate with a network. The scatter gather descriptors are used to provide address and control information about data buffers (or "scatter gather elements") in memory that the controller needs to read or write for I/O operations. For example, the descriptors provide information such as the memory location from where bytes of data are to be moved, the address to where the bytes should go, the number of bytes to move, etc.

To read a data buffer of a memory using DMA transfers, such as when the data has to be retrieved from memory so that the data can be transmitted by the controller, a driver for the controller first obtains the data buffer's physical address and length, and places this information and other control information into descriptor(s). Next, the driver writes to a command register of the controller to inform the controller that the descriptor(s) are ready to be processed. The controller then DMA transfers the descriptor(s) from memory to a first-in-first-out (FIFO) buffer, for example, so that the controller can obtain the data buffer's information (e.g., identify the data buffer's memory location, length, etc.). After the controller has processed the descriptor(s) to obtain this information, the controller DMA transfers the contents/data (e.g., frames) from the data buffer referred to by the descriptor(s).

After the DMA transfer from the data buffer is completed or after the frame has been sent, the controller informs the driver that the "send" or the "read" is complete. Indication of this completion is typically required, so that the driver can allow the frame's data to be swapped out of the data buffer (e.g., out of physical memory) by a memory manager. The controller informs the driver of these completions generally by writing to a status field of the frame's descriptor.

Each of these writes by the controller uses bus bandwidth. As more frames are sent to the controller, more of these completion writes occur. Since no actual frame data is being transferred during these completion writes, such writes are overhead.

With high-speed networks such as gigabit Ethernet, the PCI bus can be a throughput bottleneck. At gigabit Ethernet speeds, over 81 thousand maximum-sized frames can be sent per second, and over 1.6 million minimum-sized frames can be sent per second. At these frame rates, completion writes can add up to a significant amount of overhead. Such overhead reduces bus and data transfer efficiency, and can cause performance penalties.

BRIEF DESCRIPTION OF THE DRAWINGS

Non-limiting and non-exhaustive embodiments of the present invention will be described in the following figures, wherein like reference numerals refer to like parts throughout the various views unless otherwise specified.

DETAILED DESCRIPTION OF THE ILLUSTRATED EMBODIMENTS

Embodiments of a method and apparatus for improving bus efficiency when transmitting an array of frames are described in detail herein. In the following description, numerous specific details are provided, such as the description of computer system components in FIG. 1, to provide a thorough understanding of embodiments of the invention. One skilled in the relevant art will recognize, however, that the invention can be practiced without one or more of the specific details, or with other methods, components, materials, etc., In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention provides a device, such as a network controller or I/O controller, that generates a single message for an entire array of frames to indicate completion of the sending of all of the frames in the array, instead of generating one message per frame. This is done using what is hereinafter referred to as a "write back" by the controller to a status field of a scatter gather descriptor, for example. The descriptor corresponds to a sequence or set of data, such as a frame or a packet in the array, and is used in connection with the DMA-transfer of a frame from memory by the controller via a bus, although types of data transferring/reading methods other than DMA methods may be used. Such an embodiment can be used with systems that use protocols such as Transmission Control Protocol/Internet Protocol (TCP/IP) and Network Driver Interface Specification (NDIS), which support the sending of several frames to a driver at once.

Figure 1:
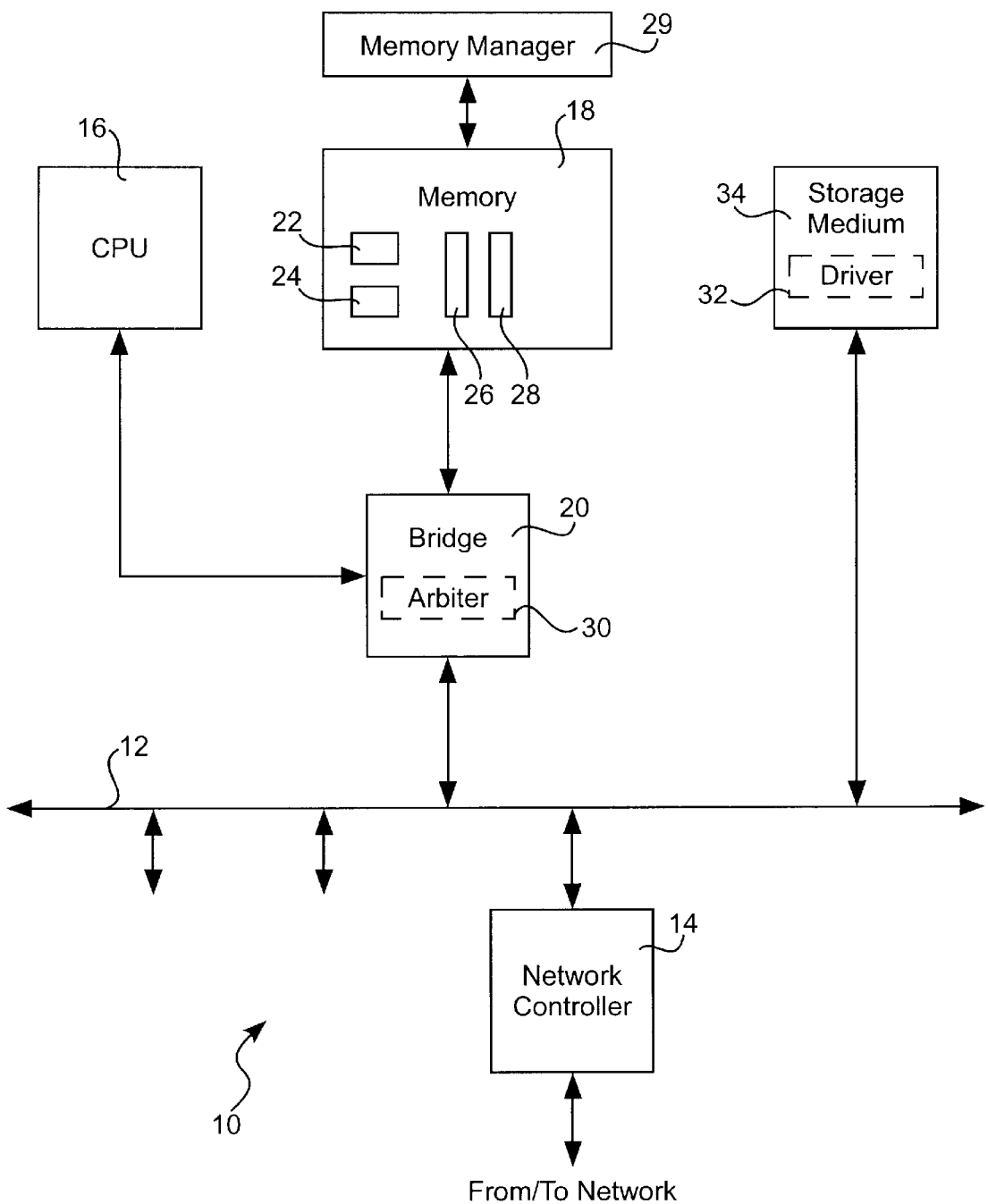
FIG. 1 is a block diagram of a system that can implement an embodiment of the invention.

Referring first to FIG. 1, shown generally at 10 is a system, such as a computer system, that can implement an embodiment of the invention. The system 10 can comprise a personal computer (PC), laptop computer, network switch, router, wireless device, or the like having the capability to connect to a network (not shown). The system 10 includes a bus 12, which can be a PCI bus, for example. It is to be appreciated that other types of busses, such as a universal serial bus (USB) or InfiniBand, may also be used.

Several devices may be directly or indirectly coupled to the bus 12. For instance, an I/O controller or network controller 14 is coupled to the bus 12 and allows the system 10 to send/receive network data, typically in the form of packets or frames. In one embodiment, the network controller 14 (sometimes referred to as an "adapter") can comprise an Ethernet MAC controller or network interface card (NIC), and it is understood that other types of network controllers, I/O controllers such as small computer system interface (SCSI) controllers, or cards may be used.

A processor 16, such as a central processing unit (CPU), and a memory 18 can be coupled to the bus 12 via a bridge 20. The memory 18, sometimes referred to as "host memory" or "system memory," comprises random access memory (RAM). The memory 18 can further include a plurality of data buffers 22 and 24 and can store a plurality of descriptors 26 and 28, for example. The descriptors 26 and 28 may or may not be contiguously connected as "descriptor rings." Although FIG. 1 shows the data buffers 22 and 24 and the descriptors 26 and 28 as residing in the memory 18, it is to be appreciated that some or all of these buffers/descriptors may be located in a storage unit separate from the memory 18 in one embodiment. A memory manager 29 allows data to be swapped out of the data buffers 22 and 24 after the data is DMA-transferred by the controller 14. In this manner, the memory manager 29 makes the data buffers 22 and 24 available for storage of new data.

To provide arbitration for use of the bus 12 (e.g., when reading from or writing to the memory 18), the bridge 20 includes an arbiter 30. A driver 32 controls operation of the network controller 14 and performs other operations related to the transfer of frames from the memory 18 and preparation of descriptors. The driver 32 is typically embodied in software that is stored in a machine-readable storage medium 34, such as a hard disk drive of the system 10, and is executed by the processor 16. As is known in the art, execution of the software of the driver 32, during normal operation, can include copying portions of this software into the memory 18 and/or into a cache (not shown) of the processor 16, and execution of the software portions from that location.

Figures 2, 3:
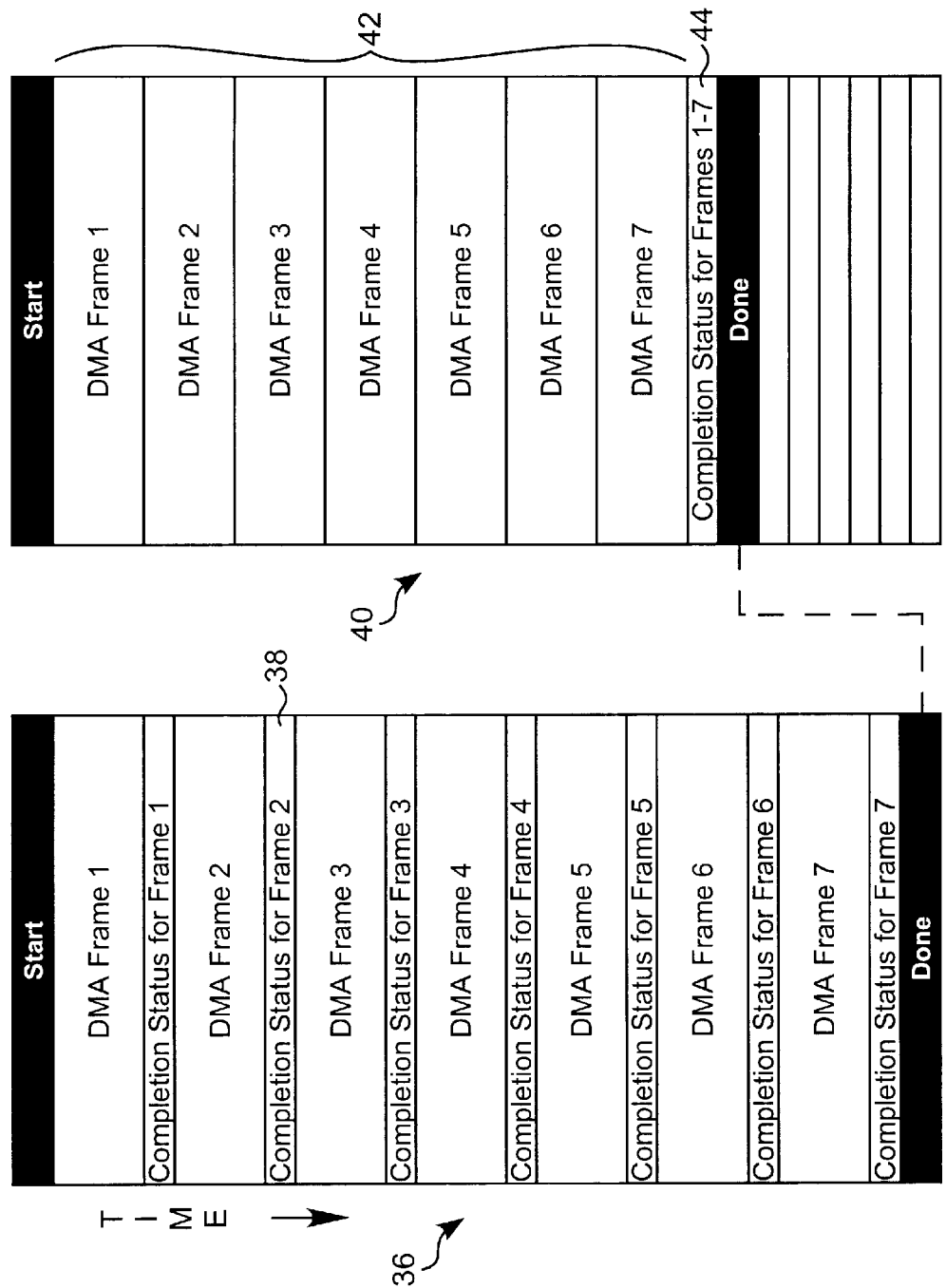
FIG. 2 illustrates a, known method of reading data by a network controller.
FIG. 3 illustrates a method of reading data that can be used by the system of FIG. 1 according to an embodiment of the invention.

An embodiment of the invention and how it compares to a prior art method are illustrated in FIGS. 2–3. FIG. 2 represents a timeline table 36 of a prior art method of reading data and performing corresponding write backs such as that described in the Background section above. In the timeline table 36, a controller performs write backs after each individual frame is sent from memory. For example, the controller performs a write back at 38 to inform its driver of a completion status of the sending or DMA transfer of Frame 2. As evident from the timeline table 36, performing a write back after completing each DMA transfer of a frame unnecessarily adds transactions to the bus and lengthens the amount of time to complete the DMA transfer of the array of Frames 1–7.

FIG. 3 represents a timeline table 40 of an embodiment of a method of reading or sending frames, and then performing a single write back to inform the driver 32 of the completion status of the sending of the frames. First, an array 42 of Frames 1–7 are DMA-transferred from corresponding data buffers of the memory 18 by the controller 14. After the DMA transfer of Frame 7 is completed in one embodiment (or after Frame 7 has been sent on to the network in another embodiment), the controller 14 performs a single write back at 44 to indicate the completion status for Frames 1–7.

In an embodiment, the controller 14 performs the write back by writing to a status field of the descriptor corresponding to the last frame from the array 42, such as the status field of the descriptor for Frame 7. The descriptor in this situation may be located in the memory 18, in an on-chip buffer (not shown) of the controller 14, or in any other suitable storage location in the system 10 that is accessible by the driver 32. According to an-embodiment, the controller 14 performs a single write back to the descriptor of the last frame in the array 42, and the driver 32 can note which frame will have the status completion reported. The driver 32 can then apply that completion status to all frames of the array 42 that were sent prior to the frame for which a write back was made by the controller 14.

The driver 32 can note or identify the particular frame for which a write back was made in several possible ways. If the array is known to have N frames, the driver 32 may look to the descriptor of the last frame (e.g., the Nth frame) in the array 42 for the completion status, for example. In another method, the driver 32 may scan all of the descriptors and try to identify the descriptor that has the completion status, and then apply the completion status to all descriptors of previously sent frames. In yet another embodiment, it is possible for the controller 14 to write back to all of the descriptors of all of the frames in the array 42, as a single write back. This may be done, for example, if the descriptors are contiguous in the memory 18, and therefore, a single write transaction can insert completion status information into all of the status fields of all of the relevant descriptors.

In an embodiment of the invention, the number N of frames in the array 42 is a variable number that is determined by a protocol stack prior to transmission from the memory 18, rather than being a constant number set by the system 10. The number N is generally chosen such that it is not impracticably large, or else extreme latency will occur since the controller 14 will hold the write back at 44 in abeyance until all frames of the large N number are sent. In this undesirable situation, the driver 32 will be unable to allow the memory manager 29 to recycle the corresponding data buffers in the memory 18 in a timely manner. As a person skilled in the art will understand, the number N of frames provided by the protocol stack is typically a practical number such that these problems generally do not occur. In environments where N may be undesirably large, an embodiment can provide a maximum threshold between write backs for frames in the array 42, in order to avoid delaying write backs too long.

In another embodiment, the number N may be a constant number that is preset by the system 10, the driver 32, or the protocol stack. With this embodiment, if less than N frames have been sent from the memory 18, then the controller 14 may be left waiting for the additional frames that complete the array 42, and as such, may impracticably delay the write back at 44. Hence in this embodiment, watchdog or callback functions can be used to determine whether the remaining frames are forthcoming. If they are not forthcoming, then the controller 14 can perform the single write back at 44 for the frames that were already sent from the memory 18. Watchdog or callback functions are not described in further detail herein because they are familiar to those skilled in the art and/or can be implemented by those skilled in the art based on the disclosure herein.

Figure 4:
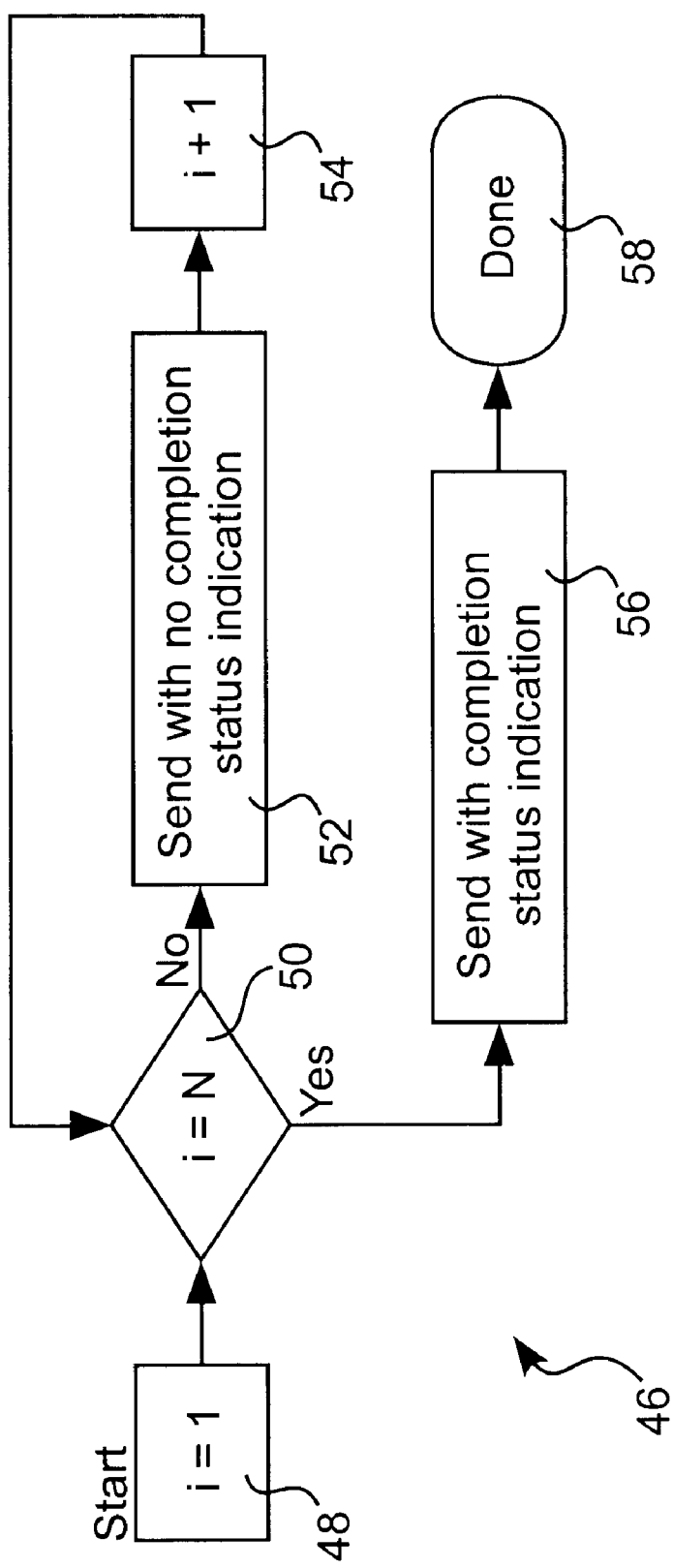
FIG. 4 is a flowchart of an algorithm that further illustrates the embodiment of the method shown in FIG. 4.

FIG. 4 is a flowchart 46 of an algorithm that can be used by the driver 32 to implement the method illustrated in the timeline table 40 of FIG. 3. Given N frames to send from the memory 18, the flowchart 46 begins at 48, where a frame counter i is initially set at 1. Next at 50, the driver 32 checks if the current frame is the Nth frame (e.g., the last frame). If the current frame is not the Nth frame, then the driver 32 sends the frame to the controller 14 at 52, and the controller 14 does not perform a write back to indicate completion status for that frame (and for preceding frames).

At 54, the frame counter i is incremented by 1, and the driver 32 again checks if the next frame is the Nth frame at 50. If the frame is not the Nth frame, then the process described above repeats at 52, 54, and 50. If at 50 the frame counter i=N, then the current frame is the last frame in the array 42. The driver 32 sends that frame to the controller 14 at 56, and the controller 14 performs a write back to indicate completion status for that frame. The driver 32 can then apply the completion status to all previously sent frames, thereby allowing the memory manager 29 of FIG. 1 to reuse the corresponding data buffers. The algorithm ends at 58. Thereafter, the process described above can be repeated for subsequent arrays having N frames.

In conclusion and as evident in FIGS. 2–3 and in the preceding discussion, an array of frames can be sent from the memory 18 to the controller 14 in a faster and more efficient manner by reducing the number of overhead write backs used to indicate that individual frame transfers are complete. Additionally, an embodiment of the invention performs write backs in such a way that completion status notifications/indications are guaranteed and do not depend on polling methods.

With polling methods, frames can be undesirably left outstanding. For instance, if a driver requested completion notification for every fifth frame and the driver was given seven frames to send to the controller, then two frames will not and may never get completion status written back. Polling methods attempt to solve this drawback by polling the controller for completion status for these leftover frames. However, polling the controller adds latency and decreases bus efficiency because polls are bus transactions driven by a bus bridge that temporarily remove bus control from the controller, which results in the controller having to subsequently re-arbitrate for bus control. Further, polling unnecessarily increases bus transaction traffic, which reduces system performance.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For example, while the embodiments described herein and shown in FIG. 3 show Frames 1–7 being sent sequentially on the single bus 12, it is to be appreciated that in another embodiment, Frames 1–7 can be sent in parallel on different busses. In such an embodiment, a single write back can be performed on each bus for the frames sent on that bus, or a single write back to indicate completion status of all frames sent on all busses can be performed by the controller 14 on just one of the busses.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:

direct memory access transferring a plurality of N frames of an array from corresponding data buffers of a memory;

writing back a single completion status notification indicative of completion of the sending of all sets of data of a plurality of sets of data;

sending an Nth frame of a plurality of N frames of an array to a DMA controller;

subsequently writing the single completion status notification into a descriptor associated with the Nth frame;

applying the single completion status notification to descriptors associated with the Nth frame and with frames of the array sent prior to the Nth frame to indicate completion of sending of the frames in the array; and writing the single completion status notification to indicate completion of a number of frames less than N, wherein the number comprises a maximum threshold value.

2. The method of claim 1 further comprising:

sending an Nth frame of the array;

subsequently writing the single completion status notification into a descriptor associated with only the Nth frame; and applying the completion status notification to descriptors associated with all N frames of the array, to indicate completion of sending of all N frames of the array.

3. The method of claim 2 wherein N is provided by a protocol stack.

4. The method of claim 2 wherein N comprises a predetermined number, the method further comprising:

using a watchdog or callback function, if less than N frames are sent, to determine if a last frame sent is a last frame of the array; and writing the completion status notification into a descriptor associated with the last frame sent, if the last frame sent is determined to be the last frame of the array.

5. The method of claim 1 wherein the frames comprise N frames of an array, the method further comprising:

sending an Nth frame of the array;

subsequently writing the single completion status notification into a descriptor associated with only the Nth frame; and applying completion status to frames of the array sent prior to the Nth frame, to indicate completion of sending of the Nth frame and of the frames sent prior to the Nth frame.

6. The method of claim 1, further comprising:
identifying one of the frames sent from the data buffers;
writing to a descriptor associated with the one frame to indicate completion of sending of that frame; and
applying completion status to frames sent prior to the one frame.

7. The method of claim 6 wherein the one frame comprises a last frame of an array of frames that are sent from the data buffers.

8. An apparatus, comprising:
a driver to send of sets of data having a plurality of N frames of an array; and
a direct memory access controller communicatively coupled to the driver to receive the sets of data sent by the driver, the controller being coupled to inform the driver that a transfer of all the sets of data is complete with a single notification,
wherein the sets of data comprise a plurality of N frames of an array, the driver being coupled to send an Nth frame of the array to the controller, the controller being coupled to subsequently write the single notification into a descriptor associated with the Nth frame, the driver being capable to apply the single notification to descriptors associated with the Nth frame and with frames of the array sent prior to the Nth frame to indicate completion of sending of the frames in the array, and
wherein the controller is capable to write the single notification to indicate completion of a number of frames less than N, wherein the number comprises a maximum threshold value.

9. The apparatus of claim 8 wherein N is provided by a protocol stack.

10. The apparatus of claim 8 wherein N comprises a preset number.

11. The apparatus of claim 8 wherein N comprises a dynamically adjustable number.

12. A system, comprising:
a storage location to store sets of data;
a driver to send the sets of data from the storage location; and
a direct memory access controller communicatively coupled to the driver to receive the sets of data from the storage location sent by the driver, the controller being coupled to inform the driver that a transfer of all the sets of data is complete with a single notification,
wherein the sets of data comprise a plurality of N frames of an array, the driver being coupled to send an Nth frame of the array to the controller, the controller being coupled to subsequently write the single notification into a descriptor associated with the Nth frame, the driver being capable to apply the single notification to descriptors associated with the Nth frame and with frames of the array sent prior to the Nth frame to indicate completion of sending of the frames in the array, and
wherein the controller is capable to write the single notification to indicate completion of a number of frames less than N, wherein the number comprises a maximum threshold value.

13. The system of claim 12 wherein the sets of data comprise a plurality of N frames of an array, the driver being coupled to send an Nth frame of the array to the controller, the controller being coupled to subsequently write the single notification into a descriptor associated with the Nth frame, the driver being capable to apply completion status to the Nth frame and to other frames of the array to indicate completion of sending of all frames of the array.

14. The system of claim 12, further comprising a memory manager to replace the sets of data stored in the storage location, subsequent to completion of transfer of these sets of data from the storage location, with other sets of data.

15. The system of claim 12, further comprising a processor to control operation of the driver.

16. The system of claim 12, further comprising a bus coupled between the controller and the storage location, the controller being capable to transfer the sets of data along the bus with direct memory access transfers.

* * * * *